US008669354B2

(12) United States Patent
Li et al.

(10) Patent No.: US 8,669,354 B2
(45) Date of Patent: Mar. 11, 2014

(54) REMOVAL OF ENDOTOXIN USING AMPHIPHILIC CORE-SHELL NANOSORBENTS

(75) Inventors: Pei Li, Hong Kong (CN); Kin Man Ho, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 0 days.

(21) Appl. No.: 13/163,764

(22) Filed: Jun. 20, 2011

(65) Prior Publication Data
US 2012/0232254 A1    Sep. 13, 2012

Related U.S. Application Data

(63) Continuation-in-part of application No. 12/359,393, filed on Jan. 26, 2009, now Pat. No. 8,404,347.

(60) Provisional application No. 61/356,115, filed on Jun. 18, 2010.

(51) Int. Cl.
C07K 1/14 (2006.01)
C07K 1/36 (2006.01)
C40B 40/04 (2006.01)

(52) U.S. Cl.
USPC ......... 530/415; 530/350; 435/91.1; 435/91.2; 435/7.1

(58) Field of Classification Search
USPC ......... 435/91.2, 91.1, 975, 6, 287.2, 458, 7.1; 530/350, 415; 536/25.4, 22.1, 23.2
See application file for complete search history.

(56) References Cited

U.S. PATENT DOCUMENTS

| 5,856,379 A | 1/1999 | Shiratsuchi et al. |
| 6,204,033 B1 | 3/2001 | Muller-Schulte |
| 6,255,477 B1 | 7/2001 | Kleiber et al. |
| 6,514,688 B2 | 2/2003 | Muller-Schulte |
| 6,573,313 B2 | 6/2003 | Li et al. |
| 2006/0216751 A1* | 9/2006 | Boschetti et al. ............... 435/7.1 |
| 2007/0184120 A1* | 8/2007 | Stutzenberger et al. ...... 424/499 |

FOREIGN PATENT DOCUMENTS

| JP | 08-176461 | 7/1996 |
| WO | WO 96/41811 A1 | 12/1996 |
| WO | WO 98/12717 A1 | 3/1998 |

OTHER PUBLICATIONS

Al, H. et al., "Magnetite-Loaded Polymeric Micelles as Ultrasensitive Magnetic-Resonance Probes", J. Adv. Mater. 2005, 17, pp. 1949-1952.

Aida, Y. et al., "Removal of endotoxin from protein solutions by phase separation using Triton X-114", J. /mmunol. Meth. 132, (1990), pp. 191-195.

Berensmeier, S. "Magnetic particles for the separation and purification of nucleic acids", Appl. Microbial. Biotechnol (2006), 73, pp. 495-504.

(Continued)

*Primary Examiner* — James J. Seidleck
*Assistant Examiner* — S. Camilla Pourbohloul
(74) *Attorney, Agent, or Firm* — Duane Morris LLP; Siegfried J. W. Ruppert (57) ABSTRACT

Method for removal of endotoxin from protein preparations using core-shell nanoparticles, which have the ability to selectively adsorb endotoxin molecules in a protein mixture. The method comprises the steps of (a) preparing a plurality of core-shell nanoparticles; (b) adding the core-shell nanoparticles into a protein preparation containing endotoxin; (c) incubating the core-shell nanoparticles with the protein preparation for a period of time; and (d) separating nanoparticles from the protein preparation.

21 Claims, 4 Drawing Sheets

(56) References Cited

OTHER PUBLICATIONS

Bergemann, C. et al., "Magnetic ion-exchange nano- and microparticles for medical, biochemical and molecular biological applications", J. Magn. and Magn. Mater 194, (1999), pp. 45-52.
Berry, C. C. et al., "Dextran and album, derivatised iron oxide nanopartcles: influence on fibroblast in vitro", Biomaterials 24, (2003), pp. 4551-4557.
Berry, C. C. et al., "Functionalisation of Magnetic Nanoparticles for Applications in Biomedicine" J. Phys. 0: Appl. Phys. 36, (2003), pp. R198-R206.
Bourgeat-Lami, E., "Organic/Inorganic Nanocomposite Colloids", Encyclopedia of Nanoscience and Nanotechnology, 2004, vol. 8, pp. 305-332.
Caruso, F. et al., "Magnetic Core-Shell Particles: Preparation of Magnetic Multilayers on Polymer Latex Microspheres", Adv. Mater 11 (1999), pp. 950-953.
Chiang, C-L et al., "Application of superparamagnetic nanoparticles in purification of plasmid DNA from bacterial cells", J. Chromatography B, 822, (2005), pp. 54-60.
Chung, D. D. L "Electromagnetic inference shielding effectiveness of carbon materials", Carbon 39, (2001), pp. 279-285.
Deng, Y. H. et al., "A Novel Approach for Preparation of Thermoresponsive Polymer Magnetic Microspheres with Core-Shell Structure", Adv. Mater(Oct. 16, 2003), 15, No. 20, pp. 1729-1732.
Denkbas, E. B. et al., "Magnetic chitosan microspheres: preparation and characterization", Reactive and Functional Polymers. 50, (2002), pp. 225-232.
Derfus, A. M. et al., "Remotely Triggered Release from Magnetic Nanoparticles", Adv, Mater 2007, 19, pp. 3932-3936.
Dresco, P. A. et al., "Preparation and Properties of Magnetite and Polymer Magnetite Nanoparticles", Langmuir 15, (1999), pp. 1945-1951.
Fraker, D. L. et al., "Tolerance to Tumor Necrosis Factor in Rats and the Relationship to Endotoxin Tolerance and Toxicity", J. Exp. Med. vol. 168, Jul. 1988, pp. 95-105.
Gu, S. et al., "Synthesis of monodisperse, magnetic latex particles with polystyrene core", Colloid Polym. Sci. (2003), 281, pp. 1076-1081.
Gupta, A. K. et al., "Synthesis and surface engineering of iron oxide nanoparticles for biomedical applications", Biomaterials 26, (2005), pp. 3995-4021.
Gupta, A. K. et al., "Surface modified superparamagnetic nanoparticles for drug delivery: Interaction studies with human fibroblast in culture", J. Mater Sci.: Malin Med., 15, (2004), pp. 493-496.
Ho, K. et al., "Design and Synthesis of Novel Magnetic Core-Shell Polymeric Particles", Lan_gmuir 24 (2008), , pp. 1801-1807.
Hong, Y. et al., "Electromagnetic interference shielding characteristics of fabric complexes coated with conductive polypyrrole and thermally evaporated Ag", Curr. Appl. Phys., 1,(2001 ), pp. 439-442.
Jin, L. et al., "Alignment of carbon nanotubes in a polymer matrix by mechanical stretching", Applied Physics Letters, vol. 73, No. 9, Aug. 31, 1998, pp. 1197-1199.
Kim, J. et al., "A Magnetically Separable, Highly Stable Enzyme System Based on Nanocomposites of Enzymes and Magnetic Nanoparticles Shipped in Hierarchically Ordered, Mesocellular, Mesoporous Silica", Small, vol. 1, No. 12, (2005), pp. 1203-1207.
Kronick, P. L. et al., "Magnetic Microspheres Prepared by Redox Polymerization Used in a Cell Separation Based on Gangliosides", Science, New Series, vol. 200, No. 4345, Jun. 2, 1978, pp. 1074-1076.
Langer, R. "New Methods of Drug Delivery" Science, New Series, vol. 249, No. 4976, Sep. 28, 1980, pp. 1527-1533.
Li, N. et al., "Electromagnetic Interference (EMI) Shielding of Single-Walled Carbon Nanotube Epoxy Composites", Nano Letters, vol. 6, No. 6, (2006), pp. 1141-1145.
Lin, Y. S. et al. "Multifunctional Composite Nanoparticles: Magnetic, Luminescent, and Mesoporous", Chem. Mater 18, (2006) pp. 5170-5172.
Lu, An-Hui et al., "Magnetic Nanoparticles: Synthesis, Protection, Functionalization, and Application", Angew. Chem. Int. Ed., 46, (2007) pp. 1222-1244.
Lu, A. H. et al., "Fabrication of Magnetically Separable Mesostructured Silica with an Open Pore System", J. Am. Chem. Soc. 126, (2004), , pp. 8616-8617.
McCarthy, B. et al., "A Microscopic and Spectroscopic Study of Interactions between Carbon Nanotubes and a Conjugated Polymer", J Phys. Chem.B. 106 (2002), pp. 2210-2216.
Moniruzzaman, M. et al., "Polymer Nanocomposites Containing Carbon Nanotubes", Macromolecules, 39, (2006), pp. 5194-5205.
Morrison, D. C. et al., "Binding of Polymyxin B to the Lipid A Portion of Bacterial Lipopolysaccharides", Immunochemistry, vol. 13, (1976), pp. 813-818.
Pankhurst, Q. A. et al., "Applications of Magnetic Nanoparticles in Biomedicine", J. Phys. 0: Appl. Phys. 36 (2003), pp. R167-R181.
Qian, D. et al., "Load transfer and deformation mechanisms in carbon nanotube-polystyrene composites", Applied Physics. Letters, vol. 76, No. 20, May 15, 2000, pp. 2868-2870.
Ramirez, L. P. et al., "Magnetic Polystyrene Nanoparticles with a High Magnetite Content Obtained by Miniemulsion Processes", Macromol. Chem. Phy_s. vol. 204, No. 1, (2003), pp. 22-31.
Saoud, F. M. et al., "Magnetic Nanoparticles for the Preparation of Ultrapure RAFT Polymers", Macromolecules 41, (2008), pp. 1598-1600.
Sauzedde, F. et al., "Hydrophilic magnetic polymer latexes. 1. Adsorption of magnetic iron oxide nanoparticles onto various cationic latexes", Colloid Polym. Sci. 277, (1999), pp. 846-855.
Shaffer M. S. P. et al., "Fabrication and Characterization of Carbon Nanotaube/Poly(vinyl alcohol) Composites", Adv. Mater, , 11, (1999), pp. 937-941.
Shan, G. B. et al., "Immobilization of *Pseudomonas delafieldii* with magnetic polyvinyl alcohol beads and its application in biodesulfurization", Biotechnology Letters, 25, (2003), pp. 1977-1981.
Shibatani, T. et al., "Purification of High Molecular Weight Urokinase from Human Urine and Comparative Study of Two Active Forms of Urokinase", Thromb Haemostas(Stuttgart) 49, (2), (1983), pp. 91-95.
Sweadner, K. J. et al., "Filtration Removal of Endotoxin (Pyrogens) in Solution in Different States of Aggregation", Applied Environ. Microbiology 34, (Oct. 1977), pp. 382-385.
Tartaj, P. et al., "The Preparation of Magnetic Nanoparticles for Applications in Biomedicine" J. Phys. D: Appl. Phys. 36, (2003), pp. R182-R197.
Ugelstad, J. et al., "Preparation and Application of New Monosized Polymer Particles", Prog. Po/ym. Sci, vol. 17, (1992), pp. 87-161.
Won, J. et al., "A Magnetic Nanoprobe Technology for Detecting Molecular Interactions in Live Cells", Science 309, Jul. 1, 2005, pp. 121-125.
Yavuz, C. T. et al., "Low-Field Magnetic Separation of Monodisperse $Fe_3O_4$ Nanocrystals", Science 314, Nov. 10, 2006, pp. 964-967.
Zhang, L. et al., "Magnetic Hollow Spheres of Periodic Mesoporous Organosilica and $Fe_3O_4$ Nanocrystals: Fabrication and Structure Control", Adv. Mater. 20, (2008), pp. 805-809.
Zhang, Y. et al., "Surface modification of superparamagnetic magnetite nanoparticles and their intracellualr uptake", Biomaterials 23, (2002), pp. 1553-1561.
Anspach FB. "Endotoxin removal by affinity sorbents.", *Journal of Biochemical and Biophysical Methods*, 49, (2000), pp. 665-681.
Guo JX, et al., "Molecular modeling analysis of the interaction of novel bis-cationic ligands with the lipid A moiety of lipopolysaccharide.", *Bioorganic & Medicinal Chemistry Letters*, 16, (2006), pp. 714-717.
Hirayama C, et al., "Chromatographic removal of endotoxin from protein solutions by polymer particles.", *Journal of Chromatography B*, 781, (2002), pp. 419-432.
Hou KC, et al., "Endotoxin removal by anion-exchange polymeric matrix.", *Biotechnology and Applied Biochemistry* 12, (1990), pp. 315-324.
Hou KC, et al., "The effect of hydrophobic interaction on endotoxin adsorption by polymeric affinity matrix.", *Biochimica et Biophysica Acta* (BBA), 1073, (1991), pp. 149-154.

(56) References Cited

OTHER PUBLICATIONS

Issekutz AC. "Removal of gram-negative endotoxin from solutions by affinity chromatography.", *Journal of Immunological Methods*, 61, (1983), pp. 275-281.

Machado RL, et al., "Evaluation of a chitosan membrane for removal of endotoxin from human IgG solutions,", *Process Biochemistry*, 41, (2006), pp. 2252-2257.

Matsumae H,, et al, "Specific removal of endotoxin from protein solutions by immobilized histidine.", *Biotechnol Appl Biochem*, 12, (1990), pp. 129-140.

Minobe S, et al., "Characteristics and applications of adsorbents for pyrogen removal.", *Biotechnology and Applied Biochemistry*, 10, (1988), pp. 143-453.

Mitzner et al., "Extracorporeal endotoxin removal by immobilized polyethylenimine.", *Artificial Organs*, 17, (1993), pp. 775-781.

Morimoto S, et al., "Preparations and applications of polyethyleneimine-immobilized cellulose fibers for endotoxin removal", *Polymer Journal*, 27, (1995), pp. 831-839.

Petsch D, et al., "Endotoxin removal with poly(ethyleneimine)-immobilized adsorbers: Sepharose 4B versus flat sheet and hollow fibre membranes.", *Journal of Chromatography B: Biomedical Sciences and Applications*, 707, (1998), pp. 121-130.

Petsch D, et al. "Endotoxin removal from protein solutions", *Journal of Biotechnology*, 76, (2000), pp. 97-119.

Petsch D, et al., "Selective adsorption of endotoxin inside a polycationic network of flat-sheet microfiltration membranes", *Journal of Molecular Recognition* 11, (1998), pp. 222-230.

\* cited by examiner

REMOVAL OF ENDOTOXIN USING AMPHIPHILIC CORE-SHELL NANOSORBENTS

CROSS-REFERENCE TO RELATED APPLICATION

This application is a continuation-in-part application of U.S. patent application Ser. No. 12/359,393, filed Jan. 26, 2009, now U.S. Pat. No. 8,404,347 and claims benefit from U.S. Provisional Application No. 61/356,115, filed Jun. 18, 2010. The entire content of both aforementioned applications are incorporated herein by reference.

FIELD OF THE INVENTION

This invention relates to a method of removing endotoxin from protein preparations. Particularly, it relates to a method using amphiphilic core-shell nanosorbents for selective removal of endotoxin from a protein mixture.

BACKGROUND OF THE INVENTION

Endotoxin, a lipopolysaccharide (hereinafter "LPS"), is originated from cell wall of most gram-negative bacteria including *Escherichia coli*, and often present in a large quantity during protein production. Since the presence of a small amount of endotoxin can cause severe inflammation and septic shock on animals, the LPS level of a protein drug shall be lower than 10 EU/mL to ensure safe usage of the drug via intravenous injection.

Current approaches to endotoxin reduction are mainly based on electrostatic interaction between positively charged adsorbents and negatively charged endotoxins. For examples, filtration, ion exchange chromatography, Triton X-114 phase separation, cationic polymer adsorbents like histamine- or histidine-immobilized Sepharose and dextran-coated particles are common methodologies. However, these methods have poor selectivity in removing endotoxins from protein solutions containing other acidic proteins such as bovine serum albumin (BSA). The poor selectivity is due to the fact that acidic proteins and endotoxins have the same negative charges at neutral pH, thus adsorption through electrostatic interaction cannot distinguish different acidic proteins, resulting in a significant loss of the desirable acidic proteins.

In order to selectively remove only the LPS, but not other proteins in a protein mixture, Miltenyi Biotech. has developed a type of magnetic particles that are coated with polycationic ligands (detailed chemical compositions are not disclosed). It is claimed that the particles could selectively adsorb LPS from BSA solution with the LPS removal efficiency up to 99% and the BSA recovery of 96%. However, such high selectivity can only be achieved at a relatively low buffer strength (e.g. 0.1 M phosphate buffer at pH 7) with a specific buffer type (phosphate buffer). For other buffer solutions such as in 50 mM Tris buffer at pH 7, although high LPS removal efficiency could still be attained, the protein recovery is substantially reduced to 67%. Another approach to achieve selective removal of LPS is the use of polymyxin B-immobilized column. Its selective property is attributed to the hydrophobic interaction between the lipid A and LPS molecules. However, this method suffers from a significant protein loss when a small sample volume is used. A microfiltration membrane made of a Nylon immobilized with cationic ligands such as polymyxin B, poly-L-lysine and poly(ethylenimine) on its surface have also been used to selectively remove LPS. Although the polymer-coated membranes can give a satisfactory adsorption capacity and show selectivity for endotoxins, their good performance is restricted to low salt concentrations (e.g. 0.02 M phosphate buffer). In addition, the leakage problem of polymyxin B during LPS adsorption process is of a serious concern because the polymyxin B is neuro- and nephrotoxic to mammals. Another concern for this method is the filter blockage which is a common problem associated with the use of microfiltration membrane. Therefore, methodology which can selectively and effectively remove endotoxins in the presence of both acidic or basic protein solution under a broad range of pH, salt concentration and type of buffer solution (e.g. 1×PBS, blood containing buffer) is still of a great demand.

Chisso Corp. disclosed an adsorbent which is made of polylysine-immobilized cellulose porous microspheres (Chisso Corp.: Cellufine™ ET clean). These adsorbents show satisfactory LPS adsorption capacity and selectivity under physiological buffers (ionic strength from 0.1 to 0.5 M, pH 7). The success of these materials contribute to two key features: the presence of selective-endotoxin binding ligand polylysine and the porous structure. The presence of porous structure provides a large surface area and appropriate pore size to selectivity adsorb and trap the LPS molecules since the endotoxins molecules are small enough to diffuse into the particle pores, and retain inside the microspheres. The larger size proteins are quickly eluted due to their sizes larger than the exclusion limit of the microspheres pores. However, since the porous cellulose microspheres are prepared by a random suspension cross-linking method, their particle and pore sizes are not uniform, resulting in poor reproducibility. In addition, this method involves a multi-step surface modifications and the use of expensive reagents such as polylysine. Another problem often encountered with the use of porous materials is the slow LPS adsorption kinetics because LPS has to diffuse from exterior environment into the pores of the microspheres for adsorption. Thus, the method is quite time-consuming (2 hour incubation time is required for a batch method). When the microspheres are packed into a column as an affinity chromatography, slow flow rate must be maintained (between 0.17 and 0.5 mL/min) in order to achieve high removal efficiency of the LPS.

Recently, Yuan et al. reported that adsorption capacity of endotoxins could be increased almost 8 times at pH<7 when using an adsorbent containing a ligand with hydroxyl group at b position adjacent to quaternary ammonium ion. The significant improvement is attributed to the strong hydrogen bonding between the hydrogen atom of phosphate group of the endotoxin molecule and the oxygen atom of the β-hydroxyl group. The hydrogen bonding results in the formation of an octatomic ring. However, this method only gives barely satisfactory LPS adsorption efficiencies due to the low grafting density of the ligand on the adsorbent. In addition, the optimal working pH for the LPS adsorption must be below pH 7, thus limiting the scope of proteins.

Therefore, there remains a strong need for a new method of endotoxin removal which overcomes the problems as described above.

SUMMARY OF THE INVENTION

Figure 1:
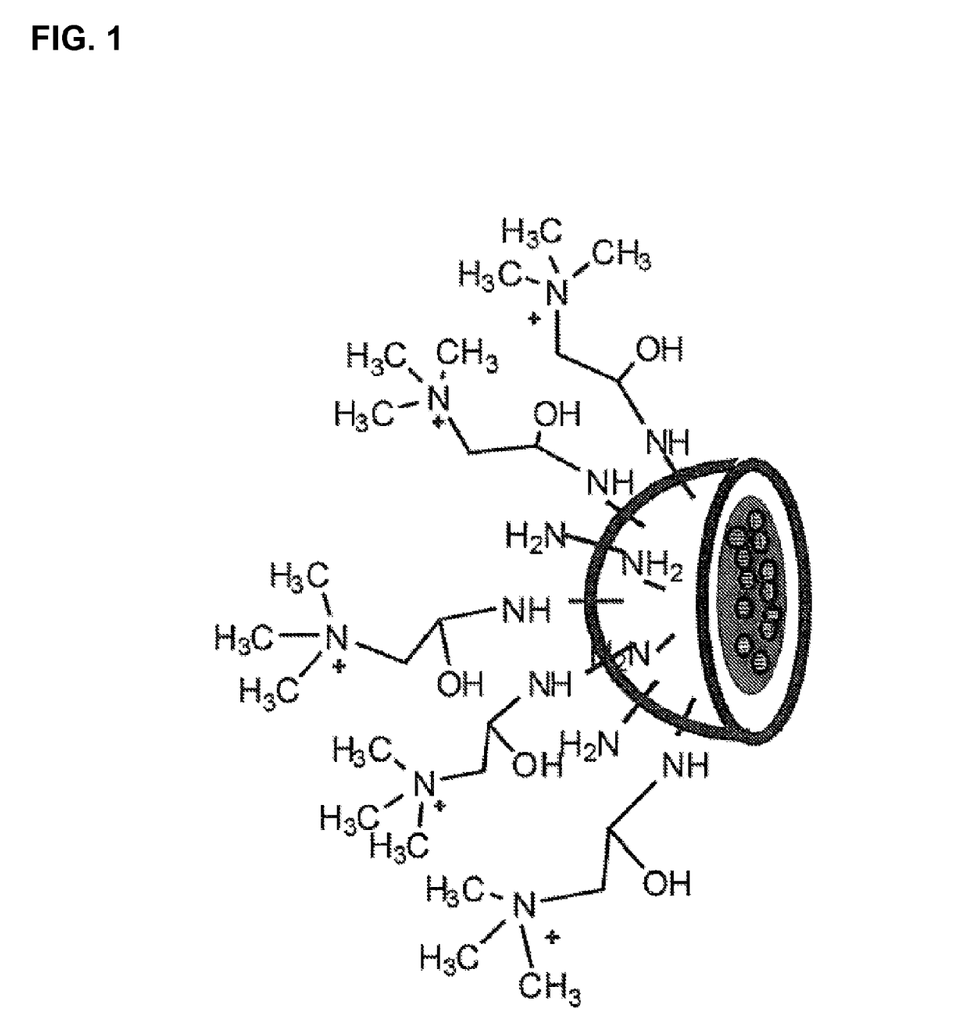
FIG. 1 is a schematic representation of structure of magnetic core-shell nanosorbents used in the present invention.

Accordingly, one object of the present invention is to provide a method which removes endotoxin from protein preparations with high selectivity and efficiency and operates in both acidic or basic protein solutions under a broad range of pH, salt concentration and type of buffer solution. The object is achieved with the use of amphiphilic core-shell nanosorbents having ability to selectively adsorb endotoxin molecules in a protein mixture. While not intending to be bound by any particular theory, it is believed that the nanosorbent comprises a core of either vinylic polymer or both vinylic polymer and magnetic nanoparticles, and a shell of cationic water-soluble polymer containing β-hydroxyl group adjacent to quaternary ammonium ion, as schematically shown in FIG. 1. The amphiphilic core-shell nanosorbent has a high endotoxin binding ability which may attribute to various molecular interactions such as hydrophobic and electrostatic interactions as well as hydrogen bonding. The method of removal endotoxin as described in the present invention involves incubating the protein solution in the presence of nanosorbents, followed by a magnetic separation or filtration. The purified protein solution has very low endotoxin level, thus allowing for further process, analyze or even administrate to mammals directly.

Preferably, the method of endotoxin removal according to the present invention comprises the steps of (a) preparing a plurality of core-shell nanoparticles; (b) adding the core-shell nanoparticles into a protein preparation containing endotoxin; (c) incubating the core-shell nanoparticles with the protein preparation for a period of time; and (d) separating nanoparticles from the protein preparation. The protein preparation can be in any suitable buffer as chosen by a person of ordinary skill in the art. Examples of suitable buffers are acetate buffer, sodium phosphate, TRIS, 1×PBS, etc. The Electrolyte concentration of the protein preparation can be of a wide range (preferably, 10 mM) and can be the same as the physiological value. The protein preparation can also be of a wide range in terms of pH values, such as from 3 to 10.

DETAILED DESCRIPTION OF PARTICULAR EMBODIMENTS OF THE INVENTION

Core-Shell Nanosorbents

The method of the present invention uses a type of core-shell nanosorbents, which has been disclosed in the parent application (U.S. patent application Ser. No. 12/359,393) The amphiphilic core-shell nanosorbents have the ability to selectively adsorb endotoxin molecules in a protein mixture. As shown in FIG. 1, the nanosorbent comprises a core of either vinylic polymer or both vinylic polymer and magnetic nanoparticles, and a shell of cationic water-soluble polymer containing β-hydroxyl group adjacent to quaternary ammonium ion. The shell can selectively bind endotoxin molecules through various tailor-made molecular interactions.

The core material used in this nanosorbent include a hydrophobic vinylic polymer such as poly(methyl methacrylate), polysytrene, poly(n-butyl acrylate), and also a mixture of vinylic polymer. The core can also be crosslinked hydrophilic polymer such as poly(N-isopropyl acrylamide). Magnetic nanoparticles can be encapsulated into the hydrophobic core for the purpose of subsequent separation of the nanosorbent under magnetic field. The magnetic nanoparticle has a formula of $MO.Fe_2O_3$, where M is iron, nickel, cobalt, manganese, copper and platinum. In a preferred embodiment, the core is composed of poly(methyl methacrylate) and maghemite nanoparticles. The cationic shell materials are natural or synthetic water-soluble polymer containing β-hydroxyl group adjacent to quaternary ammonium ion. Examples of the water-soluble polymers include N-acetyl sugars such as chitosan, or other biopolymers and synthetic amino-containing polymers such as polyethyleneimine, poly(vinyl amine)-co-poly(vinyl alcohol) poly(vinyl amine)-co-poly(acrylonitrile), etc. In the preferred embodiment, the nitrogen containing compound used in the shell is made of chitosan or a derivative thereof. The β-hydroxyl group adjacent to quaternary ammonium ion can be introduced onto the water-soluble polymer by means of a covalent linkage.

The amphiphilic core-shell nanosorbents are not particularly limited and may be in any forms of spherical porous particle, immobilized onto membranes and gels. The nanosorbents may also be in a magnetic- or non-magnetic form. When the nanosorbents are in a non-magnetic form, the nanosorbents can be separated from a protein solution using a centrifugation and/or a membrane filtration. When the nanosorbents are in a magnetic form, they can be separated under a magnetic force or employing any of methods used to remove non-magnetic nanosorbents cited above. In the preferred embodiment, spherical nanosorbents with magnetic properties are used for a small volume (<10 mL) endotoxin removal.

The method of producing magnetic core-shell nanosorbents is not particularly limited, and is disclosed in the parent application (U.S. patent application Ser. No. 12/359,393). The magnetic nanosorbents were synthesized via a hydroperoxide-induced graft polymerization of vinylic monomer(s) from a water-soluble polymer containing amino groups in the presence of vinyl-coated magnetic nanoparticles. The reaction steps include: (1) Synthesis of citrate-coated magnetic nanoparticles; (2) Surface modification of citrate-coated nanoparticles to contain vinyl-coated surface; (3) Encapsulation of vinyl-coated magnetic nanoparticles via hydroperoxide-induced graft polymerization of vinylic monomer(s) from either a water-soluble polymer containing amino groups or a water-soluble polymer containing both amino groups and β-hydroxyl group adjacent to quaternary ammonium ion. The magnetic core-shell nanosorbents produced using the method have quite uniform size distribution (polydispersity <1.20), and their particle sizes are ranging from 100 and 500 nm. However, other particle sizes may also be produced.

The method of producing β-hydroxyl group adjacent to quaternary ammonium ion on hydrophilic shell of water-soluble polymer containing amino groups is by means of covalent linkage. Primary amino groups of hydrophilic shell is converted using an epoxy compound as a reactive function group, where the compound consists of a quaternary ammonium group in a side chain thereof, such as glycidyl trimethyl ammonium chloride. It is understood that such compound is provided here as example, other compounds may also be used to achieve satisfactory results.

A preferred example of this modification is described as follows: For a total of 250 mL of solution, 1.6 g of glycidyl trimethyl ammonium chloride (GTMAC) was added into a 250 mL of core-shell particle dispersion (0.25% w/w in water) at 50-60° C. under N2 atmosphere. The resulting mixture was continuously stirred at 80° C. for 2 hours under nitrogen. After the reaction, the particle dispersion was purified by a repeated membrane filtration (using 100 nm pore size membrane) until the conductivity of the filtrate was close to that of distilled water used.

Figure 2:
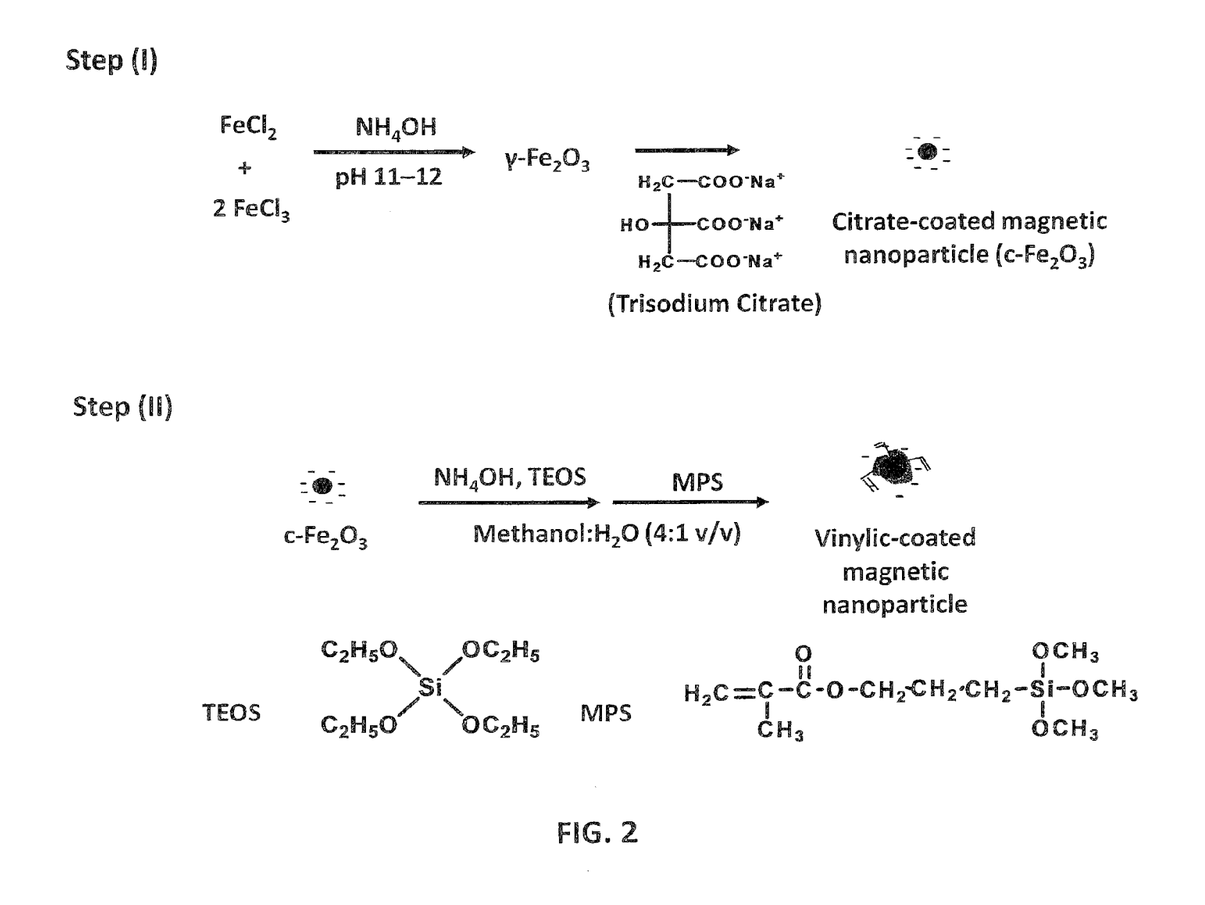
FIG. 2 shows synthetic steps in making the magnetic core-shell nanosorbents used in the present invention.

A particular embodiment of making magnetic core-shell nanosorbents comprises 4 steps as shown in FIG. 2 and described as follows.

Step 1: Synthesis of Citrate-Coated Magnetic Nanoparticle $FeCl_2 \cdot 4H_2O$ (1.99 g) and anhydrous $FeCl_3$ (3.25 g) are dissolved in water (20 mL) separately, and mixed under vigorous stirring. A $NH_4OH$ solution (0.6 M, 200 mL) is then added the stirring mixture at room temperature, immediately followed by the addition of a concentrated $NH_4OH$ solution (25 w/w %, 30 mL) to maintain the reaction pH between 11 and 12. The resulting black dispersion is continuously stirred for 1 hour at room temperature and then heated to reflux for 1 hour to yield a brown dispersion. The magnetic nanoparticles are then purified by a repeated centrifugation (3000-6000 rpm for 20 min), decantation, and redispersion cycle for 3 times until a stable brown magnetic dispersion is obtained. A total of 100 mL of the $\gamma$-$Fe_2O_3$ nanoparticle dispersion (2.42 w/w %) prepared as stated previously was acidified with a $HNO_3$ solution (4 M, 100 mL) and then centrifuged at 3000 rpm to collect the magnetic nanoparticles. The collected magnetic nanoparticles were redispersed in water (200 mL), and the dispersion was heated to reflux. Trisodium citrate dihydrate (11.7 g) was then added, followed by heating the mixture for 1 hour under reflux to produce citrate-coated iron oxide nanoparticles. The brown dispersion was purified by dialysis (10 kDa molecular weight cutoff, Sigma-Aldrich) against water with a daily change of water until the conductivity of water was comparable to that of purified $H_2O$ used.

Step 2: Synthesis of Vinyl-Coated Magnetic Nanoparticle

The c-$Fe_2O_3$ nanoparticles were first obtained as described above. A layer of silica precursor is coated on the surface of the c-$Fe_2O_3$ nanoparticles by premixing a dispersion of the purified citrate-coated nanoparticles (8.5 w/w %, 20 mL) with methanol (80 mL) for 1 hour at 40° C. Concentrated ammonia solution (25 w/w %, 1.8 mL) is added and the resulting mixture is stirred at 40° C. for 30 min. Subsequently, tetraethyl orthosilicate (TEOS, 1.0 mL) is charged to the reaction vessel and the mixture is continuously stirred for 24 hours. Finally, 3-(trimethoxysilyl)propyl methacrylate (MPS, 5.3 mL) is added and the mixture is allowed to react for 24 hours to give vinyl-coated $\gamma$-$Fe_2O_3$ nanoparticles. The vinylic-coated nanoparticles were collected by placing a permanent magnet (4 Tesla) next to the container wall, followed by discarding the solution. The collected magnetic nanoparticles were redispersed in ethanol and the dispersion was transferred into a dialysis tube (10 kDa molecular weight cutoff, Sigma-Aldrich) and dialyzed against ethanol for 1 week with a daily change of ethanol to remove the unreacted MPS, TEOS, and $NH_3$. The amounts of unreacted MPS molecules removed through the dialysis were monitored with ultraviolet (UV) measurements using a PerkinElmer UV-vis spectrophotometer (Lambda 35) at 203.5 nm. Finally, the purified dispersion was concentrated to a 10.0 w/w % solid content for subsequent reactions.

Step 3: Synthesis of Magnetic Core-Shell (MCS) Particle

For a total of 25 mL of solution, 1 mL of vinylic coated grama-phase iron oxide nanoparticle dispersion (10 w/w % in ethanol) was mixed with ethanol and then with 22 mL of chitosan solution containing 0.25 g of chitosan and 0.6 v/v % acetic acid (99 w/w %), giving a final volume ratio of $H_2O$/ethanol of 12.5:1. The dispersion was then transferred into a water-jacketed flask equipped with a thermometer, a condenser, a magnetic stirrer, and a nitrogen inlet. The dispersion was purged with nitrogen and stirred at 80° C. prior to the addition of MMA (0.6 g) and TBHP (final concentration was 0.1 mM). The resulting mixture was continuously stirred at 80° C. for 2 hours under nitrogen. After the reaction, the particle dispersion was filtered to remove precipitates (if any) generated during the polymerization. The MMA conversion (cony %) was determined gravimetrically. The particle dispersion was purified by a repeated centrifugation, decantation, and redispersion cycle until the conductivity of the supernatant was close to that of distilled water used.

Step 4: Synthesis of Magnetic Core-Shell Nanosorbents

For a total of 250 mL of solution, 1.60 g of glycidyl trimethyl ammonium chloride (GTMAC) was added into a 250 mL of magnetic core-shell particle dispersion (0.25% w/w in water) at a rate of 0.25 mL per hour at 50-60° C. under $N_2$ atmosphere. The resulting mixture was continuously stirred at 80° C. for 2 hours under nitrogen. After the reaction, the particle dispersion was purified by a repeated membrane filtration (using 100 nm pore size membrane) until the conductivity of the filtrate was close to that of distilled water used.

Selective Endotoxin Removal Using Core-Shell Nanosorbents

Figure 3:
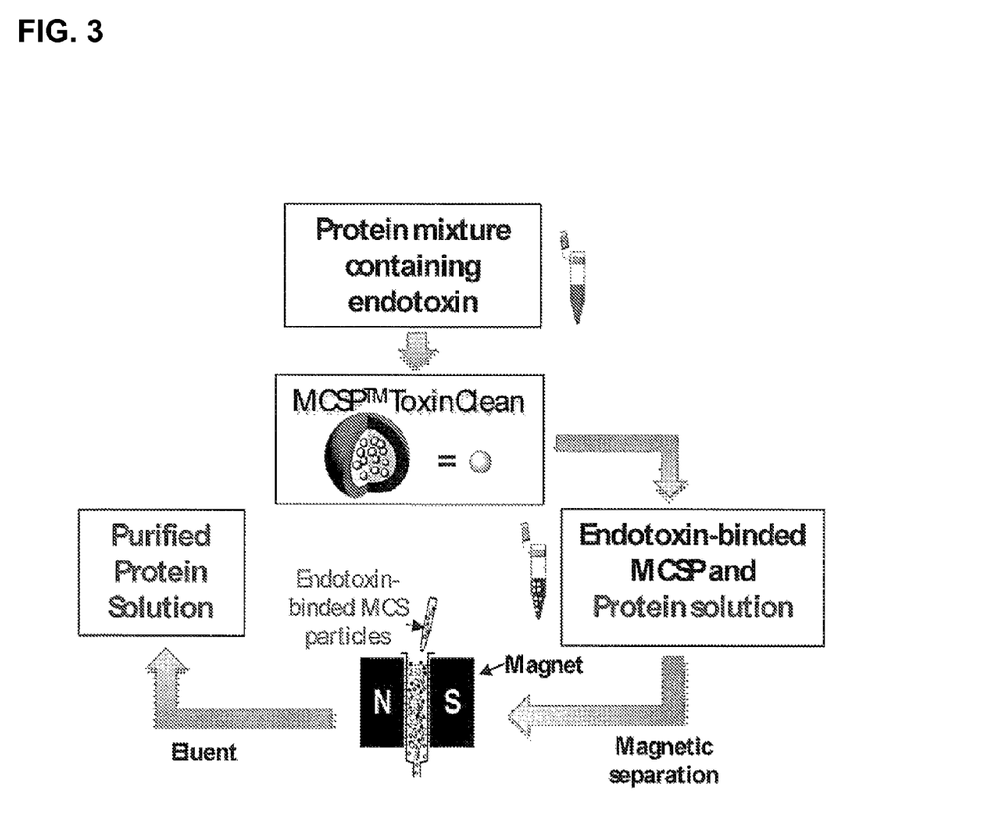
FIG. 3 is a schematic diagram showing the procedure for endotoxin removal using magnetic core-shell nanosorbents according to the present invention.

The method of selectively removing endotoxin from an endotoxin containing liquid by using the amphiphilic core-shell nanosorbents in this invention is not particularly limited. This method is particularly effective in removal of endotoxin from a solution containing other proteins in physiological buffers such as phosphate buffered saline (PBS), or the buffers used in the final step before intravenous injection. FIG. 3 shows a specific endotoxin removal method based on magnetic core-shell nanosorbents according the present invention and it involves incubating the protein solution with the nanosorbents under predetermined optimized conditions, followed by a magnetic separation, and leaving the purified protein solution. The protein solution collected has very low endotoxin level, which can be directly used for further process, analysis or even administration to mammals. Particular embodiments of the method according to the present invention are provided in the following.

Example 1

Characterization of Endotoxin Adsorption

Each of the magnetic core-shell nanosorbents prepared in the Examples were weighed, and dispersed in water. Their final concentrations were all 0.55%. For a total of 2 mL solution, 0.35 mL of above magnetic core-shell nanosorbents having an average diameter of 150 nm was introduced into a 1 mL of sodium phosphate buffer (pH 6.995, 20 mM). Then, 3 ng/mL *E. coli*-derived endotoxin (LPS manufactured by Wako Pure Chemical Industries, Ltd.) was added thereto and incubated at room temperature for 30 min. After incubation, the mixture was subjected to a magnetic separation, collecting the purified solution. Measurement of the endotoxin concentration of the treated solution was conducted using a TachypleusAmebocytelysate (TAL) assay (Zhanjiang A & C biological Ltd.).

Experiments of magnetic core-shell nanosorbents on endotoxin adsorption in other buffer and pH solutions were obtained in the same manner as in Example 1. Results on adsorption efficiency and capacity are summarized in Table 1. The nanosorbents showed high removal efficiencies (>98%) of endotoxin in a broad pH range and in various buffer agents.

TABLE 1

Endotoxin Adsorption Capacity in Various buffer and pH solutions

| Buffer/reagent | pH range | Electrolyte concentration | Endotoxin removal efficiency (%) | Endotoxin capacity (EU/mg of nanosorbents) |
|---|---|---|---|---|
| | 4 | 10 mM | 98.5-98.67% | 1555-1557 |

TABLE 1-continued

Endotoxin Adsorption Capacity in Various buffer and pH solutions

| Buffer/reagent | pH range | Electrolyte concentration | Endotoxin removal efficiency (%) | Endotoxin capacity (EU/mg of nanosorbents) |
|---|---|---|---|---|
| Acetate buffer | 5 | 10 mM | 98.17-98.33% | 1550-1553 |
| | 6 | 10 mM | 98.3-98.5% | 1553-1555 |
| | 7 | 10 mM | 99.17-99.33% | 1566-1568 |
| Sodium phosphate | 8 | 10 mM | 99.67-99.83% | 1576-1577 |
| TRIS | 9 | 10 mM | 93.5-93.67% | 1476-1479 |
| 1x PBS | 7.2 | 1x | 99.67-99.83% | 1573-1576 |

Example 2

Process of Selective Removal of Endotoxin

For a total of 2 mL solution, 0.35 mL of magnetic core-shell nanosorbents having an average diameter of 150 nm were introduced into a 0.2 mL of 10× phosphate buffered saline (pH 7.2). Subsequently, 0.4 mL bovine serum albumin (BSA, 5 mg/mL) followed by 3 ng/mL *E. coli*-derived endotoxin (LPS manufactured by Wako Pure Chemical Industries, Ltd.) were added thereto. The mixture was then incubated at room temperature for 30 min. After incubation, the mixture was subjected to a magnetic separation. The purified solution was collected. Measurement of the endotoxin concentration of the resulting solution was conducted using a TachypleusAmebocytelysate (TAL) assay, and protein concentration was determined by a protein assay according to the Bradford method.

Experiments of the nanosorbents on endotoxin adsorption in the presence of various protein mixtures were conducted in the same manner as the above procedure. Results on adsorption efficiency and capacity are summarized in Table 2. The nanosorbents showed high endotoxin adsorption (>98%), but almost no protein adsorption (>99% protein recovery) under physiological buffer (1×PBS). This result indicates that the nanosorbent can selectively remove endotoxin in the presence of even a negative protein.

TABLE 2

Selective Endotoxin Adsorption from Various Protein Mixtures Using Magnetic Core-Shell Nanosorbents.

| Protein | Isoelectric point (pI) | Buffer | Protein conc. (mg/mL) | Initial amount of endotoxin unit | adsorption capacity (EU/mg) | Endotoxin Removal (%) | Protein recovery (%) |
|---|---|---|---|---|---|---|---|
| BSA | 4.7 | 1x PBS | 1.0 | 3000 | 1566-1568 | 99.0-99.2 | >99 |
| Human arginase | 9.3 | 1x PBS | 0.09 | 3000-4000 | 1573-1576 | 99.7-99.8 | >99 |
| Lyzozyme | 10.7 | 1x PBS | 1.0 | 3000 | 1555-1558 | 98.5-98.67 | >99 |

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A method of selectively removing endotoxin from a protein preparation, comprising the steps of:
    (a) adding a plurality of core-shell nanoparticles to a protein preparation comprising endotoxin and a plurality of proteins;
    (b) incubating the core-shell nanoparticles with the protein preparation thereby binding the majority of endotoxin to the core-shell nanoparticles while not binding the majority of the plurality of proteins to the core-shell nanoparticles; and
    (c) separating the endotoxin bound to the core-shell nanoparticles from the plurality of proteins of the protein preparation not bound to the core-shell nanoparticles;
    wherein, at least 93.5% of the endotoxin is removed from the protein preparation.

2. The method of claim 1, wherein the protein preparation is in a buffer and has a pH value between 3 and 10.

3. The method of claim 2, wherein the buffer is selected from the group consisting of acetate butter, sodium phosphate buffer, TRIS, and 1xPBS.

4. The method of claim 2, wherein the buffer is an acetate buffer and the pH value is from 4 to 5.

5. The method of claim 2, wherein the buffer is a sodium phosphate buffer and the pH value is from 6 to 8.

6. The method of claim 2, wherein the buffer is TRIS and the pH value is around 9.

7. The method of claim 2, wherein the buffer is 1×PBS and the pH value is around 7.2.

8. The method of claim 1, wherein the protein preparation has an electrolyte concentration between 5 mM to 15 mM.

9. The method of claim 8, wherein the electrolyte concentration is about 10 mM.

10. The method of claim 1, wherein the protein preparation has the same electrolyte concentration as that of 1×PBS.

11. The method of claim 1, wherein the protein preparation comprises a protein which has an isoelectric point between 4 and 11.

12. The method of claim 1, wherein the core-shell nanoparticles are magnetic and wherein step (c) is conducted by a magnetic force.

13. The method of claim 1, wherein the core-shell nanoparticles are non-magnetic and wherein step (c) is conducted by filtration or by centrifugation.

14. The method of claim 1, wherein at least 98% of the endotoxin is removed from the protein preparation.

15. The method of claim 1, wherein at least 99% of the plurality of proteins do not bind to the core-shell nanoparticles.

16. The method of claim 1, wherein the core-shell nanoparticles comprise a core of a vinylic polymer or of a vinylic polymer and a magnetic particle.

17. The method of claim 16, wherein the vinylic polymer is selected from the group consisting of poly(methyl methacrylate), polystyrene, poly(n-butyl acrylate) and combinations thereof.

18. The method of claim 16, wherein the magnetic nanoparticle has a formula of $MOFe_2O_3$, wherein M is selected from the group consisting of iron, nickel, cobalt, manganese, copper and platinum.

19. The method of claim 17, wherein the core comprises poly(methyl methacrylate) and maghemite nanoparticles.

20. The method of claim 1, wherein the core-shell nanoparticles comprise a shell of a cationic water-soluble polymer.

21. The method of claim 20, wherein the cationic water-soluble polymer comprises a β-hydroxyl group adjacent to a quaternary ammonium ion.

* * * * *